United States Patent [19]

Beall

[11] Patent Number: 4,728,474
[45] Date of Patent: Mar. 1, 1988

[54] METHOD FOR MAKING A PLASTIC SPRING

[75] Inventor: Glenn L. Beall, Gurnee, Ill.

[73] Assignee: Plough, Inc., Memphis, Tenn.

[21] Appl. No.: 425,804

[22] Filed: Sep. 28, 1982

[51] Int. Cl.$^4$ .............................................. B29C 45/38
[52] U.S. Cl. ...................................... 264/161; 249/59; 264/328.11
[58] Field of Search ................... 249/59, 107; 264/161, 264/328.1, 328.11, 328.12, 334, DIG. 40; 425/288, 463, 573, DIG. 7

[56] References Cited

U.S. PATENT DOCUMENTS

| | | | |
|---|---|---|---|
| 568,511 | 9/1896 | Brooke | 249/110 |
| 2,323,286 | 6/1943 | Ward | 18/34 |
| 2,520,263 | 8/1950 | Vinal | 264/161 |
| 2,587,070 | 2/1952 | Spillman | 18/30 |
| 3,081,992 | 3/1963 | Kessler | 267/1 |
| 4,101,618 | 7/1978 | Aoki | 264/161 |
| 4,422,986 | 12/1983 | Cole | 264/334 |

FOREIGN PATENT DOCUMENTS 57-64530 4/1982 Japan ................................ 249/107

OTHER PUBLICATIONS

Plastics Mold Engineering Handbook, J. H. Dubois and W. I. Pribble, Van Nostrand Reinhold Co., 1978, pp. 295, 399-410, 425.

Primary Examiner—Jan H. Silbaugh
Attorney, Agent, or Firm—Gerald S. Rosen; Warrick E. Lee, Jr.

[57] ABSTRACT

Method and apparatus are disclosed for making multi-turned plastic springs. At least 2 mold sections forming a central opening and a cavity with many turns are placed around a hollow sleeve having sufficient opening to flow molten plastic to individual turns. After the plastic solidifies the sleeve is moved with respect to the mold sections to shear a spring that has formed in the cavity from a plastic core in the sleeve. The mold sections are then opened and the spring is removed.

6 Claims, 6 Drawing Figures

METHOD FOR MAKING A PLASTIC SPRING

This invention relates to the manufacture of small springs made of stiff plastic material. Such springs are useful in electrical and electronic apparatus where their lack of electrical conductivity is desirable. Stiff plastic springs are also useful in toys and other small items of manufacture requiring parts made of inexpensive material.

Plastic materials having sufficient stiffness for use as springs are very viscous in the molten state and difficult to mold. Ward, in U.S. Pat. No. 2,323,286 discloses a method of making a plastic spring by filling a spiral mold from one end of the spiral. However, use of this method to make a small spring having many turns with viscous plastic is unsatisfactory because it is very difficult to cause the viscous plastic to completely fill the mold. A method for economically manufacturing small plastic springs of relatively stiff material is needed.

One aspect of the present invention, which fulfills the need, comprises:

A method for molding a plastic spring having a plurality of turns comprising:
(a) disposing at least two mold sections in a closed position around a hollow sleeve, the mold sections, when in said closed position, forming a central opening for the sleeve and a cavity having a plurality of turns forming the shape of the spring around the sleeve, the sleeve having sufficient opening such that its hollow portion is in fluid communication with individual turns of the cavity,
(b) flowing molten plastic into the hollow portion of the sleeve, through the sleeve's opening, into individual turns of the cavity,
(c) allowing the plastic to solidify to form solidified plastic in the hollow portion of the sleeve and a solidified plastic spring in the cavity,
(d) providing relative motion between the sleeve and the mold sections so as to separate the solidified plastic in the hollow portion of the sleeve from the solidified plastic spring,
(e) moving the mold sections to an open position away from the spring and
(f) removing the plastic spring from the sleeve.

A second aspect of the invention comprises:

Apparatus for molding a plastic spring having a plurality of turns comprising:
(a) a plurality of mold sections adapted to be disposed in a closed position to form a central opening, a channel in fluid communication with said central opening, and a cavity around said central opening, said cavity having a plurality of turns forming the shape of the spring, and in an open position such that said mold sections are disposed away from the space occupied by said cavity when said mold sections are in the closed position,
(b) a hollow sleeve capable of being disposed in said central opening when said mold sections are in the closed position, said sleeve having sufficient opening such that its hollow portion is in fluid communication with individual turns of the cavity formed when said mold sections are in the closed position, and
(c) means for providing relative motion between said sleeve and said mold sections when said mold sections are in the closed position.

A third aspect of the invention comprises:

A molded plastic spring having a plurality of turns and shear marks on the interior of individual turns.

As used throughout the present specification and claims the term "plastic" is intended to mean a moldable substance including thermoplastic resins which after melting solidify upon cooling and thermosetting resins which solidify upon being heated to a sufficient cross-linking temperature. Preferable plastics used in making springs according to the invention include nylon, polyacetal, and polypropylene.

DETAILED DESCRIPTION OF THE INVENTION

Figure 1:
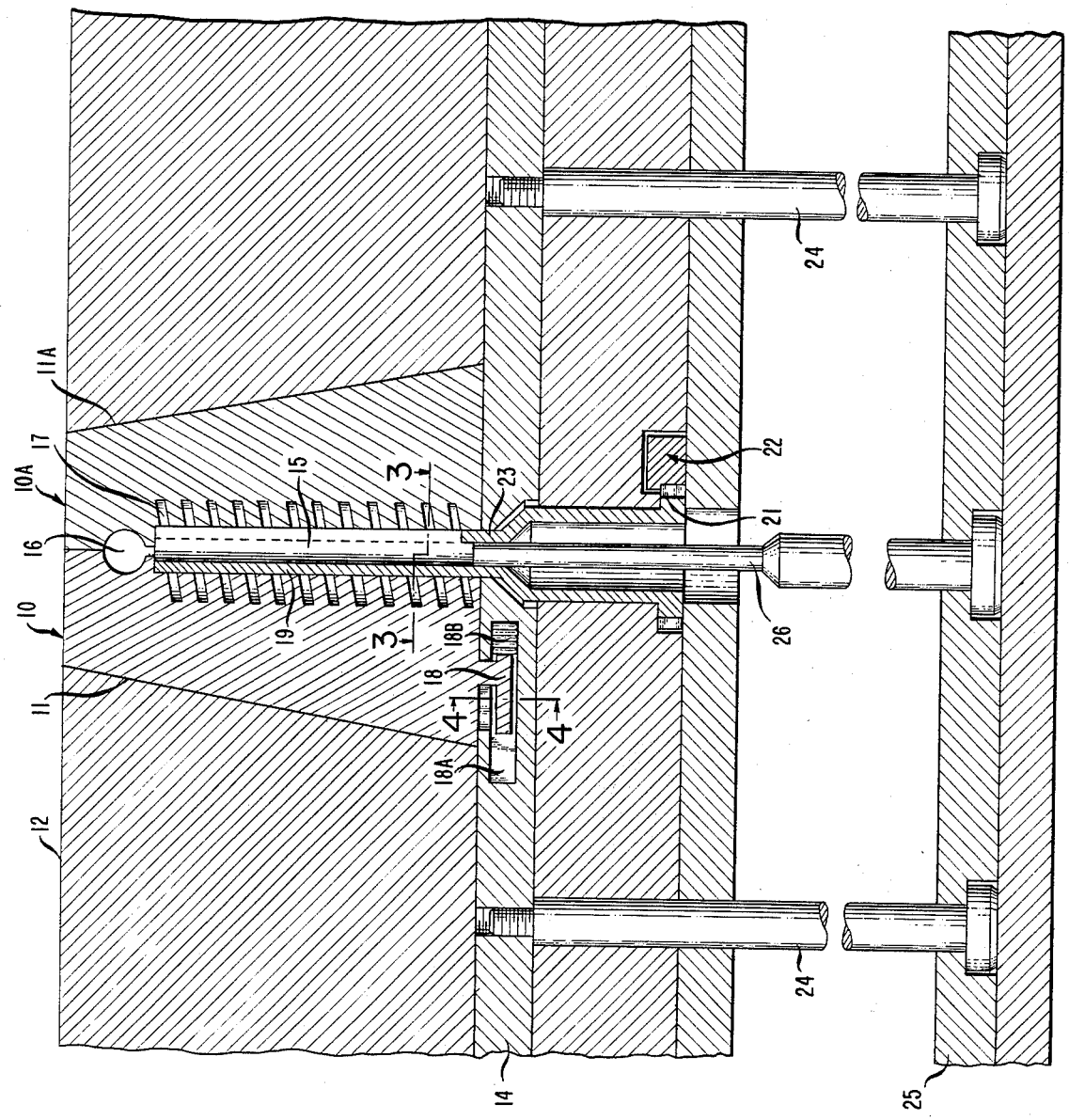
FIG. 1 is a vertical sectional view of molding apparatus in accordance with the invention showing the mold sections closed.

FIGS. 1, 2, 3, 4 and 5 illustrate a preferred embodiment of apparatus in accordance with the invention. At least two mold sections are provided. More complicated spring shapes require more than two mold sections. In this embodiment two mold sections 10 and 10A are used. The mold sections are adapted to be placed in a closed position, as in FIG. 1, and in an open position as in FIG. 2. The manner of moving the mold sections between the open and closed positions is optional. The mold sections may have outer sloping surfaces 11 and 11A. A plate 12, having sloping surfaces to match those of the mold sections may be used to cam the mold sections into the closed position as shown in FIG. 1. Removal of plate 12 allows the mold sections to open as in FIG. 2. Each mold sections may have a projection 18 (shown only for mold section 10) riding in a slot 18A. (See FIG. 4.) Spring 18B acting on projection 18 pushes each mold section to the open position when plate 12 is removed as in FIG. 2. Alternately, The mold sections may be attached to plate 12 by angle pins (not shown) so that raising plate 12 causes the molds to move to the open position.

When closed the mold sections form a central opening 15, a channel 16 leading to central opening 15, and a cavity 17 having a plurality of turns. Cavity 17 has the shape of the spring to be molded. When the mold sections are opened as in FIG. 2 they are moved away from the space previously occupied by cavity 17 when the molds were closed, to allow removal of the molded spring.

Figure 5:
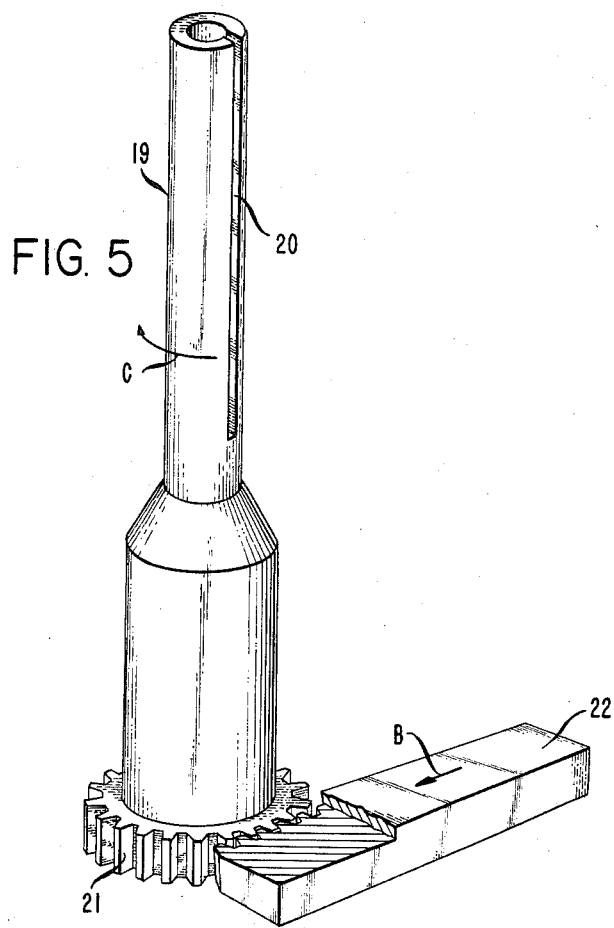
FIG. 5 is an isometric view of the hollow sleeve and rack gear.

With the molds closed a hollow sleeve 19 is disposed in central opening 15. A critical feature of the invention is sufficient opening in sleeve 19 to allow its hollow portion to be in fluid communication with individual turns of cavity 17. This allows plastic to flow into cavity 17 at several points, thereby completely filling the cavity. Preferably sleeve 19 has a slit 20 running the length of central opening 15. This provides an opening for plastic to flow into every turn of cavity 17. Hollow sleeve 19 and slit 20 are best illustrated in FIG. 5.

Means for providing relative motion between sleeve 19 and mold sections 10 and 10A are provided. This is best accomplished by providing means for rotating the sleeve within the molds. A pinion gear 21 mounted on the lower end of sleeve 19 meshes with a rack 22. Longitudinal movement of rack 22 causes gear 21 and sleeve 19 to rotate. (See FIG. 5.)

Figure 2:
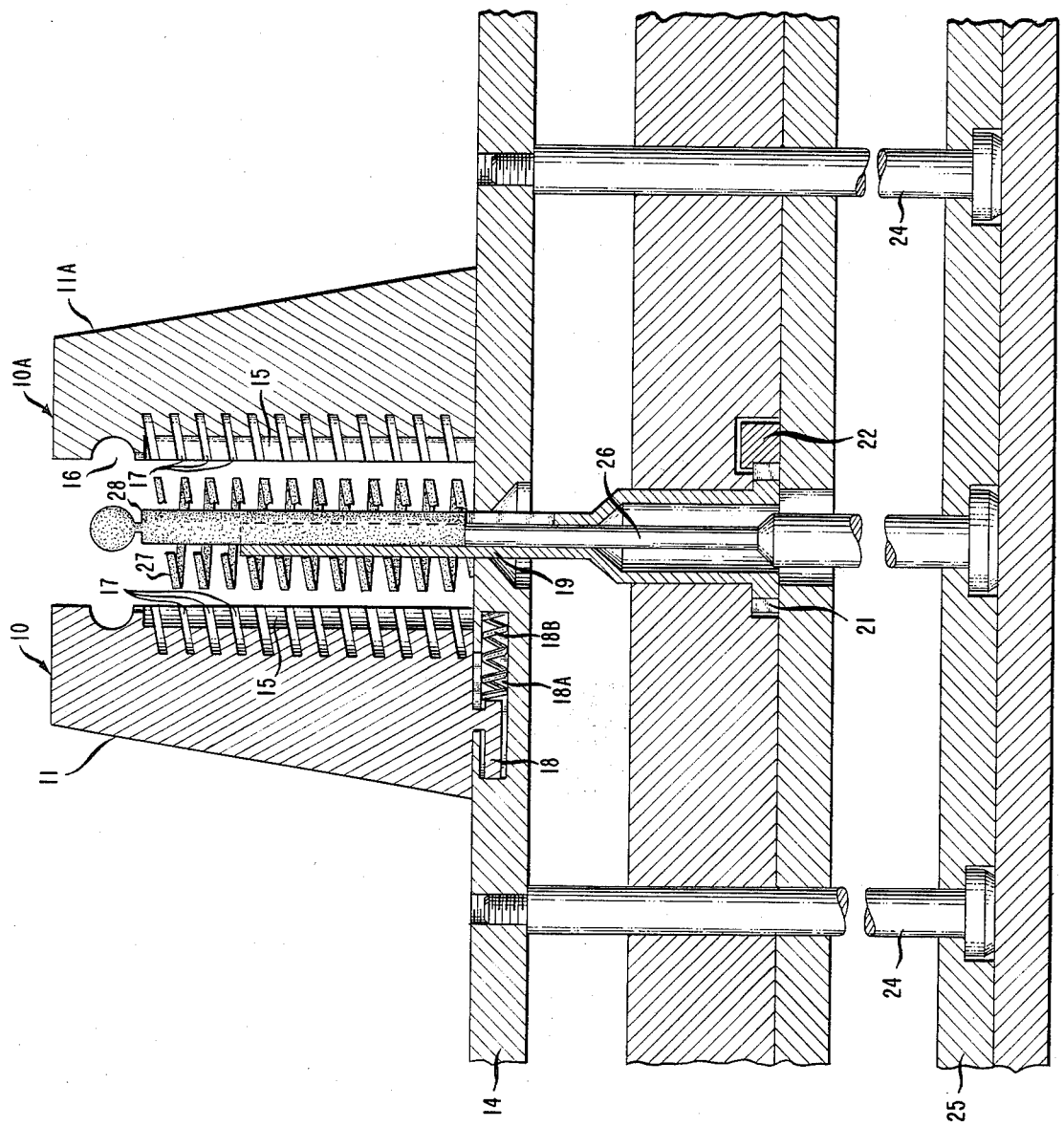
FIG. 2 is a vertical sectional view similar to FIG. 1 showing the mold sections open.
Figure 3:
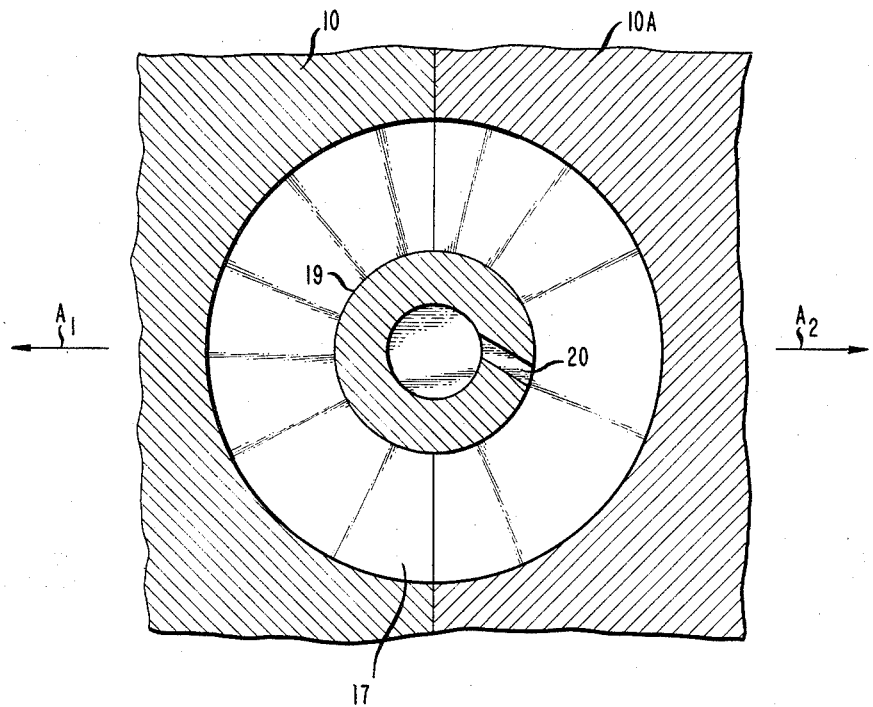
FIG. 3 is a view taken along section 3—3 of FIG. 1.
Figure 4:
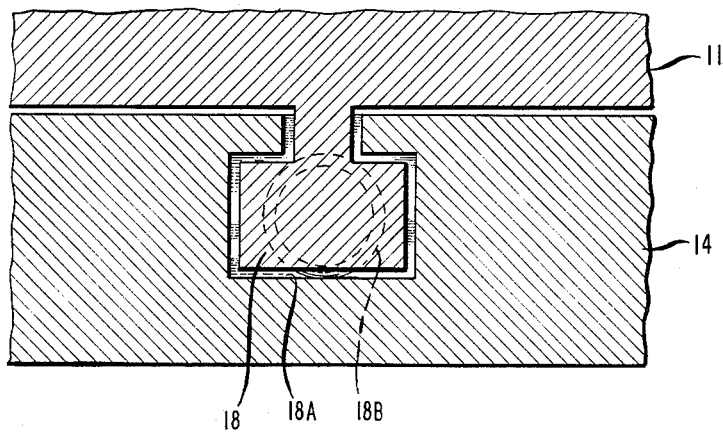
FIG. 4 is a view taken along section 4—4 of FIG. 1.

Optional Elements are provided for efficient operation of the apparatus. Stripper plate 14 having a close-fitting opening 23 for sleeve 19 is provided. Stripper plate 14 is connected by shoulder bolts 24 to ejector plate 25, which may be moved vertically with respect to sleeve 19. An ejector pin 26 is also mounted on ejector plate 25, such that pin 26 enters the hollow portion of sleeve 19 when ejector plate 25 moves upward as shown in FIG. 2. Ejector pin 26 also acts as a closure for one end of sleeve 19.

The apparatus functions as follows. Mold sections 10 and 10A are closed with sleeve 19 in central opening 15 as shown in FIG. 1. Molten plastic material is pumped by a conventional extruder (not shown) through channel 16 into the hollow portion of sleeve 19, and through the multiple openings provided by slit 20 into the individual turns of cavity 17. The plastic is then allowed to solidify. If thermoplastic material is used, solidification occurs upon cooling. If an injection-moldable thermosetting resin is used, then the molds would be heated by means not shown (such as steam flowing through channels in the mold sections) to its cross-linking or curing temperature.

Upon solidification, the plastic in cavity 17 is in the form of the desired spring, and that within sleeve 19 is a core to be separated from the spring and discarded or recycled. Separation of core and spring is accomplished by moving rack 22 in the direction of arrow B (see FIG. 4), causing sleeve 19 to rotate in the direction of arrow C. The shearing edge of slit 20, best seen in FIG. 3 shears the spring from the core of plastic in sleeve 19. Hence, springs made in accordance with the invention will be characterized by shear marks on the interior of individual turns. Shear marks are small tear marks or "rough spots" that form when molded plastic is separated from the core of plastic in hollow sleeve 19.

After shearing the mold sections are opened as shown in FIG. 2. Lifting plate 12 causes mold section 10 to move in the direction of arrow A₁ and mold section 10A to move in the direction of arrow A₂ in FIG. 3. Ejector plate 25 moves upward causing stripper plate 14 to strip the molded spring 27 from sleeve 19. Simultaneously ejection pin 26 pushes the core of solidified plastic 28 from the hollow portion of sleeve 19, thereby preparing the apparatus for another molding cycle.

Figure 6:
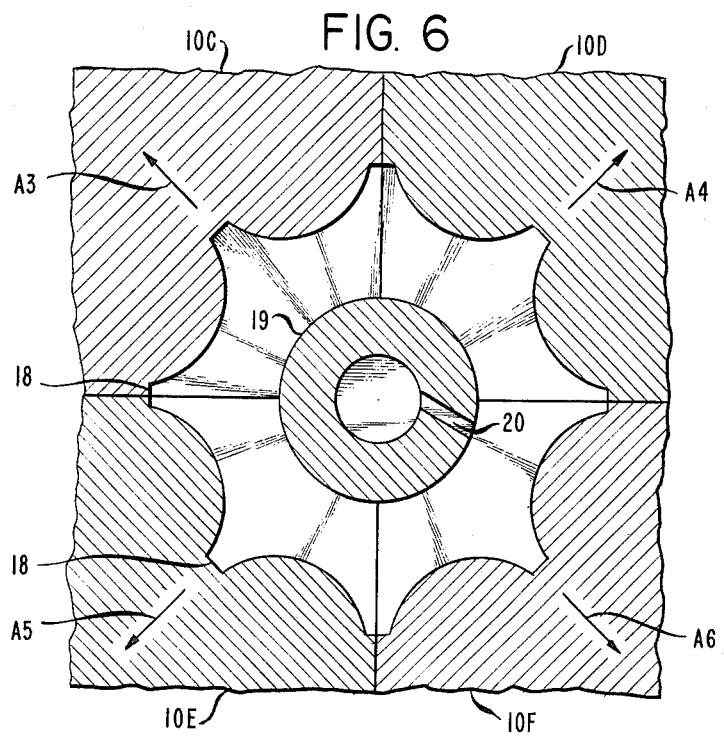
FIG. 6 is a view similar to FIG. 3 showing apparatus for making an alternate spring shape.

For some applications it is highly desirable for the molded spring to have a plurality of projections, such as when the spring is to be used as part of the mascara applicator disclosed by Kingsford, U.S. Pat. No. 3,998,235. FIG. 6 shows how the invention can be used to make such a spring. The spring has projections 18. In the embodiment shown, four mold sections 10C, 10D, 10E, and 10F are used. Upon opening, the four mold sections move in the directions of arrows A3, A4, A5, and A6, respectively. Hollow sleeve 19 and the remainder of the apparatus other than the mold sections may be the same as that of FIGS. 1, 2, 3, 4, and 5. The invention has several advantages not achieved by the prior art:

1. A method is provided for filling a cavity having many turns with very viscous plastic material.
2. The spring may have a plurality of radial projections or other desired external shape.
3. Shear marks are on the interior of the springs. If such marks were on the outside, the spring would obviously be unacceptable as a mascara applicator unless the marks were polished by an expensive and inconvenient extra manufacturing step.
4. The apparatus is relatively simple and inexpensive and allows for high speed mass production.

What is claimed is:
1. A method for molding a plastic spring having a plurality of turns comprising:
   (a) disposing at least two mold sections in a closed position around a hollow sleeve, the mold sections, when in said closed position, forming a central opening for the sleeve and a cavity having a plurality of turns forming the shape of the spring around the sleeve, the sleeve having sufficient opening such that its hollow portion is in fluid communication with individual turns of the cavity,
   (b) flowing molten plastic into the hollow portion of the sleeve, through the sleeve's opening, into individual turns of the cavity,
   (c) allowing the plastic to solidify to form solidified plastic in the hollow portion of the sleeve and a solidified plastic spring in the cavity,
   (d) providing relative motion between the sleeve and the mold sections so as to separate the solidified plastic in the hollow portion of the sleeve from the solidified plastic spring,
   (e) moving the mold sections to an open position away from the spring, and
   (f) removing the plastic spring from the sleeve.

2. The method of claim 1 wherein the opening in the sleeve is a slit running the length of the central opening.

3. The method of claim 2 wherein said step (d) relative motion is provided by rotating the sleeve within the central opening.

4. The method of claim 3 further comprising
   (g) removing solidified plastic from the sleeve by inserting a pin into the sleeve.

5. The method of claim 1 wherein the spring has a plurality of projections and wherein more than 2 mold sections disposed around the sleeve in step (a).

6. The method of claim 5 wherein 4 mold sections are disposed around the sleeve in step (a).

* * * * *